(12) United States Patent
Liang et al.

(10) Patent No.: US 10,178,406 B2
(45) Date of Patent: Jan. 8, 2019

(54) CONTROL OF VIDEO ENCODING BASED ON ONE OR MORE VIDEO CAPTURE PARAMETERS

(75) Inventors: Liang Liang, San Diego, CA (US); Szepo R. Hung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 12/774,491

(22) Filed: May 5, 2010

(65) Prior Publication Data

US 2011/0110420 A1    May 12, 2011

Related U.S. Application Data

(60) Provisional application No. 61/258,913, filed on Nov. 6, 2009.

(51) Int. Cl.
*H04N 11/02* (2006.01)
*H04N 19/523* (2014.01)
(Continued)

(52) U.S. Cl.
CPC ......... *H04N 19/523* (2014.11); *H04N 19/107* (2014.11); *H04N 19/109* (2014.11); *H04N 19/115* (2014.11); *H04N 19/119* (2014.11); *H04N 19/124* (2014.11); *H04N 19/132* (2014.11); *H04N 19/154* (2014.11);
(Continued)

(58) Field of Classification Search
USPC ........................................ 375/240.01, 12, 16
See application file for complete search history.

(56) References Cited

U.S. PATENT DOCUMENTS 5,576,767 A    11/1996   Lee et al.
5,877,809 A     3/1999   Omata et al.
(Continued)

FOREIGN PATENT DOCUMENTS

CN    101098405 A    1/2008
CN    101305396 A    11/2008
(Continued)

OTHER PUBLICATIONS

Budagavi M: "Video Compression using Blur Compensation", Image Processing, 2005, ICIP 2005, vol. 2, Sep. 11, 2005 (Sep. 11, 2005), pp. 882-885, XP010851195, DOI:10.1109/ICIP.2005. 1530197 ISBN: 978-0-7803-9134-5.
(Continued)

*Primary Examiner* — Leron Beck
(74) *Attorney, Agent, or Firm* — Kilpatrick Townsend & Stockton, LLP

(57) ABSTRACT

This disclosure describes techniques for improving functionalities of a video encoder, using parameters detected and estimated by a front-end video capture device. The techniques may involve estimating a blurriness level associated with frames captured during a refocusing process. Based on the estimated blurriness level, the quantization parameter (QP) used to encode blurry frames is adjusted either in the video capture device or in the video encoder. The video encoder uses the adjusted QP to encode the blurry frames. The video encoder also uses the blurriness level estimate to adjust encoding algorithms by simplifying motion estimation and compensation in the blurry frames.

46 Claims, 7 Drawing Sheets

(51) Int. Cl.
  *H04N 19/119* (2014.01)
  *H04N 19/172* (2014.01)
  *H04N 19/115* (2014.01)
  *H04N 19/61* (2014.01)
  *H04N 19/107* (2014.01)
  *H04N 19/109* (2014.01)
  *H04N 19/124* (2014.01)
  *H04N 19/132* (2014.01)
  *H04N 19/154* (2014.01)
  *H04N 19/179* (2014.01)

(52) U.S. Cl.
  CPC ......... *H04N 19/172* (2014.11); *H04N 19/179* (2014.11); *H04N 19/61* (2014.11)

(56) References Cited

U.S. PATENT DOCUMENTS

| | | | |
|---|---|---|---|
| 6,078,726 | A | 6/2000 | Gotoh et al. |
| 6,704,045 | B1 | 3/2004 | Brett |
| 6,822,758 | B1 * | 11/2004 | Morino ........................ 358/1.9 |
| 7,071,974 | B2 | 7/2006 | Tojo |
| 7,084,909 | B2 * | 8/2006 | Yamasaki ...................... 348/239 |
| 7,304,681 | B2 | 12/2007 | Larner et al. |
| 7,409,144 | B2 | 8/2008 | McGrath et al. |
| 7,463,755 | B2 | 12/2008 | Duan |
| 7,495,692 | B2 | 2/2009 | Tanaka et al. |
| 7,528,883 | B2 * | 5/2009 | Hsu .............................. 348/345 |
| 7,573,305 | B1 | 8/2009 | Cosand et al. |
| 7,720,148 | B2 * | 5/2010 | Au et al. .................. 375/240.12 |
| 8,094,714 | B2 | 1/2012 | Nakazato et al. |
| 2002/0196362 | A1 | 12/2002 | Yang et al. |
| 2004/0179593 | A1 * | 9/2004 | Goldstein et al. ....... 375/240.01 |
| 2006/0029265 | A1 | 2/2006 | Kim et al. |
| 2006/0039471 | A1 | 2/2006 | Dane et al. |
| 2006/0083299 | A1 | 4/2006 | Kitajima |
| 2006/0171569 | A1 | 8/2006 | Budagavi |
| 2006/0202945 | A1 | 9/2006 | Feng |
| 2006/0232697 | A1 | 10/2006 | Ito et al. |
| 2006/0238641 | A1 | 10/2006 | Konishi |
| 2007/0030381 | A1 | 2/2007 | Maeda |
| 2007/0040917 | A1 | 2/2007 | Kobayashi |
| 2007/0070250 | A1 | 3/2007 | Zhou et al. |
| 2007/0110170 | A1 | 5/2007 | Hoshino |
| 2007/0171973 | A1 | 7/2007 | Kobayashi |
| 2007/0189386 | A1 | 8/2007 | Imagawa et al. |
| 2008/0002048 | A1 | 1/2008 | Ito et al. |
| 2008/0084506 | A1 | 4/2008 | Bazin et al. |
| 2008/0123747 | A1 | 5/2008 | Lee et al. |
| 2008/0143883 | A1 | 6/2008 | Hsuan |
| 2008/0278601 | A1 | 11/2008 | Goel et al. |
| 2009/0051783 | A1 * | 2/2009 | Kim et al. ................. 348/229.1 |
| 2009/0060373 | A1 | 3/2009 | Perera et al. |
| 2009/0074396 | A1 * | 3/2009 | Park et al. .................... 396/128 |
| 2009/0207234 | A1 | 8/2009 | Chen et al. |
| 2009/0244319 | A1 * | 10/2009 | Kim et al. ................. 348/229.1 |
| 2009/0262233 | A1 | 10/2009 | Nagahata et al. |
| 2010/0086035 | A1 * | 4/2010 | Park et al. ................ 375/240.12 |
| 2010/0278231 | A1 * | 11/2010 | Gutman et al. .......... 375/240.02 |
| 2011/0109758 | A1 | 5/2011 | Liang et al. |
| 2011/0116726 | A1 | 5/2011 | Hosaka et al. |
| 2011/0150366 | A1 * | 6/2011 | Yoda .............................. 382/305 |
| 2011/0292997 | A1 | 12/2011 | An et al. |

FOREIGN PATENT DOCUMENTS

| | | | |
|---|---|---|---|
| JP | 2006121224 | A | 5/2006 |
| JP | 2006197005 | A | 7/2006 |
| JP | 2007082186 | A | 3/2007 |
| JP | 2007142649 | A | 6/2007 |
| JP | 2007221631 | A | 8/2007 |
| JP | 2007295129 | A | 11/2007 |
| JP | 2008160189 | A | 7/2008 |
| JP | 2010079446 | A | 4/2010 |
| WO | WO0201488 | A1 | 1/2002 |
| WO | 2006023789 | | 3/2006 |
| WO | WO2006094033 | A1 | 9/2006 |
| WO | WO2007142646 | A1 | 12/2007 |
| WO | 2009017138 | A1 | 2/2009 |
| WO | 2009088976 | A1 | 7/2009 |
| WO | WO2009107849 | A1 | 9/2009 |
| WO | 2010102913 | A1 | 9/2010 |
| WO | 2010116400 | A1 | 10/2010 |

OTHER PUBLICATIONS

International Search Report and Written Opinion—PCT/US2010/054149, ISA/EPO—May 6, 2011.

Ribas-Corbera Jordi et al., "Optimal motion vector accuracy for block-based motion-compensated video coders", Proceedings of SPIE, SPIE, USA, vol. 2668, Jan. 1, 1996 (Jan. 1, 1996), pp. 302-314, XP002336827, ISSN: 0277-786X, DOI:10.1117/12.235425.

Wiegand T et al: "Overview of the H.264/AVC video coding standard", IEEE Transactions on Circuits and Systems for Video Technology, IEEE Service Center, Piscataway, NJ, US, vol. 13, No. 7, Jul. 1, 2003 (Jul. 1, 2003), pp. 560-576, XP011221093, ISSN: 1051-8215, DOI: DOI:10.1109/TCSVT.2003.815165.

Cheolhong An: "Motion blur adaptive Rate Control", 2010 44th Asilomar Conference on Signals, Systems and Computers—Nov. 7-10, 2010—Pacific Grove, CA, USA, IEEE, Piscataway, NJ, USA, Nov. 7, 2010 (Nov. 7, 2010), pp. 426-429, XP031860650, DOI: 10.1109/ACSSC.2010.5757593 ISBN: 978-1-4244-9722-5.

Dickinson B.W., et al., "Temporally Adaptive Motion Interpolation Exploiting Temporal Masking in Visual Perception", 3 IEEE Transactions on Image Processing 513-526 (Sep. 1994).

Gokstorp M: "Computing depth from out-of-focus blur using a local frequency representation" Pattern Recognition, 1994. vol. 1, Conference A: Computer Vision & Image Processing, Proceedings of the 12th IAPR International Conference on Jerusalem, Israel Oct. 9-13, 1994, Los Alamitos, CA, USA,IEEE Comput. Soc, vol . 1, Oct. 9, 1994 (Oct. 9, 1994), pp. 153-158, XP010215959 ISBN: 978-0-8186-6265-2 *abstract, Figure 5, sections 1-2, equation (7) *.

Korpi-Anttila J., "Automatic Colour Enhancement and Scene Change Detection of Digital Video", 32 Graphic Arts in Finland 1-10 (Apr. 2003).

Blelloch G.E., "Introduction to Data Compression," Carnegie Mellon University, Jan. 31, 2013.

* cited by examiner

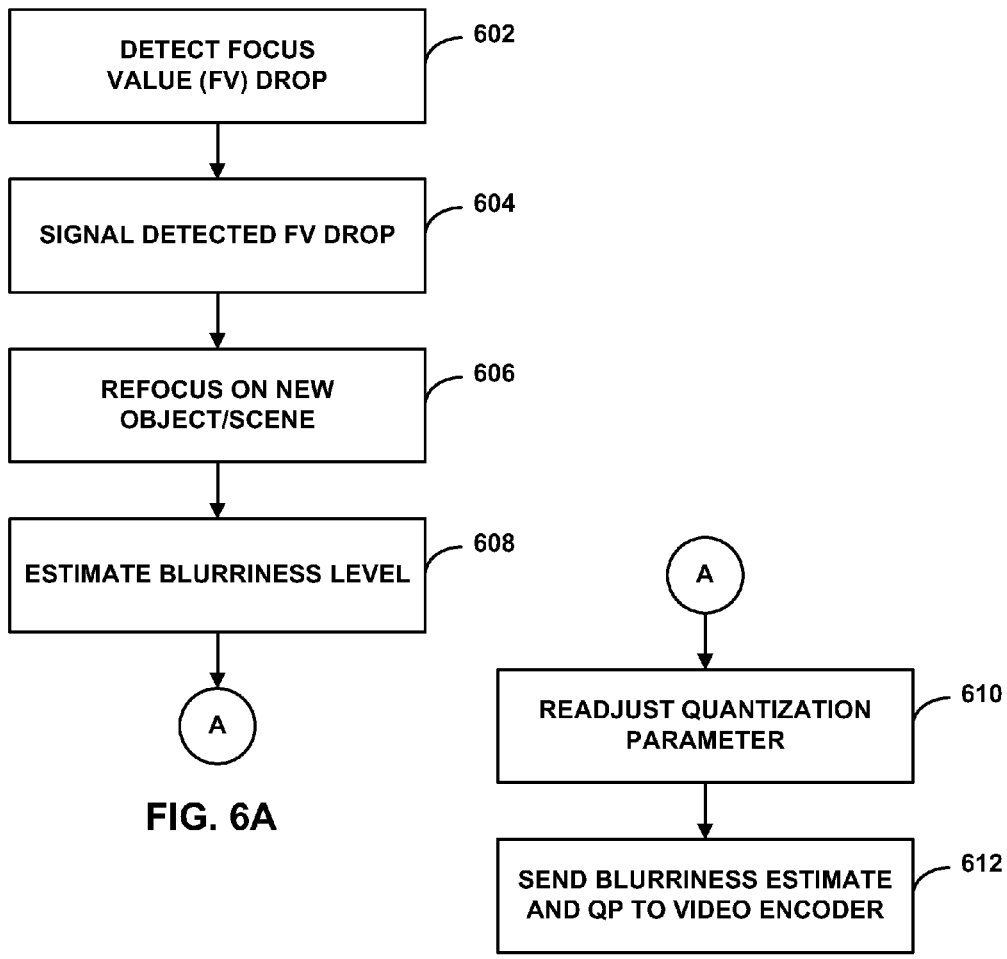
FIG. 6A
FIG. 6B
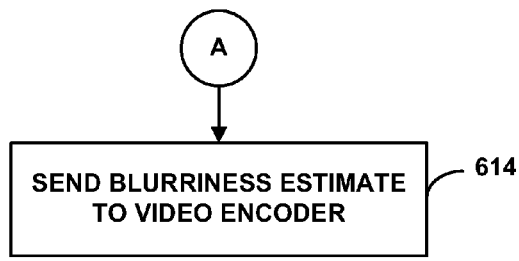
FIG. 6C

CONTROL OF VIDEO ENCODING BASED ON ONE OR MORE VIDEO CAPTURE PARAMETERS

This application claims the benefit of U.S. Provisional Application 61/258,913, filed on Nov. 6, 2009, the entire content of which is incorporated herein by reference.

TECHNICAL FIELD

The disclosure relates to video coding.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently.

Video encoding techniques may perform video compression via spatial and temporal prediction to reduce or remove redundancy inherent in video sequences. A video capture device, e.g., video camera, may capture video and send it to video encoder for encoding. The video encoder processes the captured video, encodes the processed video, and transmits the encoded video data for storage or transmission. In either case, the encoded video data is encoded to reproduce the video for display. The available bandwidth for storing or transmitting the video is often limited, and is affected by factors such as the video encoding data rate.

Several factors contribute to the video encoding data rate. Therefore, when designing video encoders, one of the concerns is improving the video encoding data rate. Generally, improvements are implemented in the video encoder and often add extra computation complexity to the video encoder, which can offset some of the benefits of an improved video encoding data rate.

SUMMARY

This disclosure describes techniques for controlling video coding based, at least in part, on one or more parameters of a video capture device. The techniques may be performed in a video capture device, such as a camera. The video capture device may sense, measure or generate one or more parameters.

In one example, this disclosure describes a method comprising estimating, in a video capture module, a blurriness level of a frame of video data captured during a refocusing process of the video capture module, and encoding, in a video encoder, the frame based at least in part on the estimated blurriness level of the frame.

In another example, this disclosure describes a system comprising means for estimating, in a video capture module, a blurriness level of a frame of video data captured during a refocusing process of the video capture module, and means for encoding, in a video encoder, the frame based at least in part on the estimated blurriness level of the frame.

In another example, this disclosure describes a system comprising a video capture module to estimate a blurriness level of a frame of video data captured during a refocusing process of the video capture module, and a video encoder to encode the frame based at least in part on the estimated blurriness level of the frame.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a non-transitory, computer-readable storage medium and loaded and executed in the processor.

Accordingly, this disclosure also contemplates a computer-readable medium comprising instructions for causing a programmable processor to estimate, in a video capture module, a blurriness level of a frame of video data captured during a refocusing process of the video capture module, and encode, in a video encoder, the frame based at least in part on the estimated blurriness level of the frame.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 6A-6C are flow diagrams illustrating video encoding using an estimate of blurriness levels in captured frames in accordance with techniques of this disclosure.

DETAILED DESCRIPTION

Figure 1:
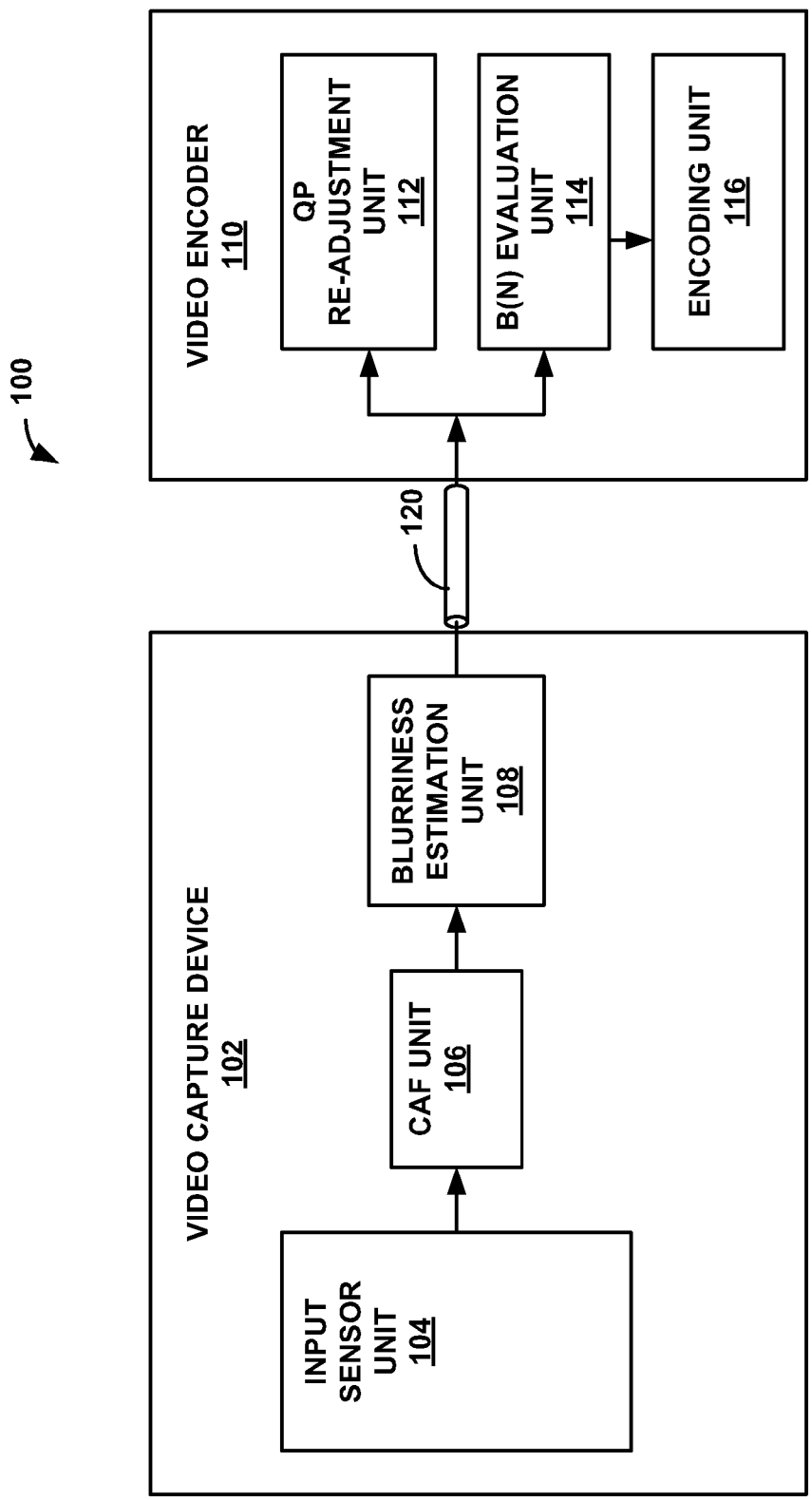
FIG. 1 is a block diagram illustrating an exemplary video capture device and video encoder system that may implement techniques of this disclosure.

This disclosure describes techniques for controlling video coding based, at least in part, on one or more parameters of a video capture device. In some examples, a video encoder may control video coding based on an estimate of blurriness levels in frames during refocus in a video capture device that supports a continuous auto-focus (CAF) process. In a video system, such as a video encoding system, bandwidth limits may be a concern, and may be affected by parameters such as, for example, video encoding data rate. In one example, techniques in accordance with this disclosure may adjust one or more aspects of a video coding process, such as video encoding data rate, based on characteristics of video frames captured by the video capture device. In one example, bits may be allocated more efficiently in encoding video frames based on the estimated blurriness level of the frames, thus optimizing the video encoding data rate.

During a real-time video recording, blurriness in a video frame can be caused by several factors. For example, fast motion of the video capture device or a fast motion of an object in an image being captured by the video capture device, e.g., a video camera, may cause blurriness as the camera or object moves too quickly to focus. Blurriness may also occur during the refocusing phase in a system with CAF or during refocus when manual focusing is used. In video capture devices that use CAF, the lens position may be adjusted continuously, e.g., on a frame-by-frame basis, to achieve the best focus performance. When an object of interest has changed or moved during video recording, the video capture device refocuses by finding the new focal plane of a new object of interest. Blurriness occurs during this refocus process, and the frames the device captures until the new focal plane is found may be blurry until refocus is achieved. Video encoders perform video data rate control by performing computations to make determinations regarding the content of frames. These computations generally add computational complexity to the video encoder.

Techniques of this disclosure may include performing functions in a video capture device based on parameters determined and/or measured by the video capture device. In one aspect of this disclosure, the video encoder may reduce additional computational complexity by using information the video encoder obtains from the video capture device that records the video frames.

In one example, a video capture device may estimate an amount of blurriness in video frames during a refocusing phase of a CAF process, e.g., during a fast motion of the device. The video capture device may send to the video encoder the estimate of the amount of blurriness in a video frame. Based on the amount of blurriness in a video frame, the video encoder may allocate less data rate, i.e., less coding bits, to encode frames with an amount of blurriness above a certain threshold, without having to evaluate the blurriness within the video encoder. Rather, the encoder may rely on the blurriness parameter already determined by the video capture device. For example, the video encoder may allocate less data rate to encode blurry frames, because blurry frames generally have a lower visual quality that is not affected by using lower data rates. When the content of a video frame becomes blurry, in accordance with one aspect of this disclosure, a video encoder may allocate less data rate, i.e., coding bits, to encode a blurry frame, thereby reducing bandwidth consumption while maintaining an acceptable overall visual quality, given the blurriness.

In one aspect of the disclosure, the quantization parameter (QP) may be adjusted based on the blurriness estimate, and may vary based on the amount of blur in a frame. In another aspect of the disclosure, the video encoder may encode frames using different size block partitions for prediction coding and motion compensation. In another aspect of the disclosure, the video encoder need not implement algorithms for determining whether frames are blurry and the amount of blurriness in them, as these are decided by the video capture device.

Using the techniques of this disclosure, simplified video encoding algorithms may reduce the video encoder's computational complexity and a lower data rate may reduce bandwidth used by the video encoder. The blurriness estimate may be reported to the video encoder from the video capture device. The video encoder may, in turn, determine that a particular frame is blurry without expending encoder resources to detect blurriness, which may be a computationally-intensive operation when done by the video encoder. Instead, the video encoder may rely on the blurriness estimate evaluated by video capture device.

Aspects of this disclosure may be utilized in any of a variety of recording devices, which may be a stand-alone recording device or a portion of a system. For purposes of this discussion, a video camera is used as an exemplary video capture device.

FIG. 1 is a block diagram illustrating an exemplary video capture device and video encoder system 100 that may implement techniques of this disclosure. As shown in FIG. 1, system 100 includes a video capture device 102, e.g., video camera that captures and sends a video stream to video encoder 110 via link 120. Video capture device 102 and video encoder 110 may comprise any of a wide range of devices, including mobile devices. In some examples, video capture device 102 and video encoder 110 comprise wireless communication devices, such as wireless handsets, personal digital assistants (PDAs), mobile media players, cameras, or any devices that can capture and encode video data. In some examples, video capture device 102 and video encoder 110 may be contained in the same enclosure as part of the same system. In other examples, video capture device 102 and video encoder 110 may reside in two or more different devices, and may be part of two or more different systems. If video capture device 102 and video encoder 110 reside in two or more different devices, link 120 may be a wired or wireless link.

In the example of FIG. 1, video capture device 102 may include an input sensor unit 104, a CAF unit 106, and a blurriness estimation unit 108. Video encoder 110 may include QP re-adjustment unit 112, frame blurriness evaluation unit 114, and encoding unit 116. In accordance with this disclosure, video capture device 102 may be configured to estimate the level of blurriness of frames and send the blurriness estimate to the video encoder 110. The video encoder 110 may use blurriness information to determine appropriate video encoding data rate and/or simplify video encoding algorithms.

Input sensor 104 of video capture device 102 may sense frame image contents for capturing. Input sensor unit 104 may include a camera lens coupled to a sensor such as, for example, a charge coupled device (CCD) array or another image sensing device that receives light via the camera lens and generates image data in response to the received image. Video capture device 102 may utilize a CAF process while recording a video. In a CAF process, the camera lens position may continuously adjust to achieve acceptable focus on objects in the video frames. When a new object of interest comes into the scene being captured by input sensor unit 104, the user moves video capture device 110 to capture a different object or different scene, or an object within a scene moves, input sensor unit 104 may detect the presence of the new object. Input sensor unit 104 may then send a signal to the CAF unit 106, which analyzes the received signal and determines, based on a focus value of the signal, that a new object was detected in the scene and triggering a refocus process. Refocusing on a new object may involve actions such as, for example, adjusting the lens position until the video capture device achieves a desired focus by analyzing focus values of the signals received from input sensor unit 104, where each signal includes the pixels of a frame. CAF unit 106 may send an indication to the blurriness estimation unit 108 indicating that CAF unit 106 is performing the refocus process. The blurriness estimation unit 108 may estimate the blurriness in frames while refocusing is occurring. The blurriness estimation unit 108 may estimate the a blurriness B(n) associated with frame n, and send B(n)

to video encoder 110. Estimating the blurriness level will be described in more detail below.

Video encoder 110 may receive the blurriness estimate B(n) for frames with blur, and may utilize the blurriness level in encoding the video frames, without having to perform additional calculations to determine the amount of blur in the frames. In one example, video encoder 110 may utilize the blurriness level for QP readjustment 112. In other words, video encoder 110 may adjust the QP value for encoding a frame based on an estimated level of blurriness for the frame.

The QP regulates the amount of detail preserved in an encoded image. Video encoders perform quantization, e.g., of residual values, during encoding. The residual values may be discrete cosine transform (DCT) coefficient values representing a block of residual values representing residual distortion between an original block to be coded, e.g., a macroblock, and a predictive block, in a reference frame, used to code the block. In one example, when an encoder utilizes a very small QP value for higher quantization, a great amount of image detail is retained. However, using a very small QP value results in a higher encoding data rate. As the QP value increases, the video encoding rate drops, but some of the detail is lost, and the image may become more distorted. In blurry images, details of the images are already distorted, and a video encoder may increase the QP, without affecting the quality of the image. Video encoders may implement algorithms to determine whether a frame is blurry. These algorithms, however, add computational complexity to the video encoder.

According to techniques of this disclosure, video encoder 110 may not need to determine whether a frame is blurry. Instead, video encoder 110 may receive an indication that a frame is blurry from the video capture device 102. In one example, video encoder 110 may receive an estimated blurriness level B(n) for a frame n to be encoded, and determine based on that blurriness level whether to increase or decrease the QP. In other words, video encoder 110 may adjust the QP values based on the estimated blurriness level B(n) obtained from video capture device 102. In one example, video encoder 110 may use a larger QP to encode frames with a higher amount of blurriness, and use a smaller QP to encode frames with a lower amount of blurriness. In this manner, video encoder 110 may allocate more coding bits to less blurry frames and less coding bits to more blurry frames. Although larger and smaller QP values are described herein as corresponding to more and less quantization, respectively, the opposite may be the case for some coding techniques.

In another example, video encoder 110 may utilize the blurriness level to simplify the encoding algorithm implemented by video encoder 110. A simplified encoding algorithm may be, for example, an algorithm that uses integer pixel precision, instead of fractional pixel precision, for motion estimation search. Other encoding algorithm simplifications may involve, for example, utilize skip mode, modifying the reference picture list used in motion estimation, and modifying block partition size for prediction code and motion compensation, as explained in more detail below. In image encoding, interpolation is used to approximate pixel color and intensity based on color and intensity values of surrounding pixels, and may be used to improve compression in inter-coding. Inter-coding refers to motion estimation to track movement within adjacent frames, and indicates displacement of blocks within frames relative to corresponding blocks in one or more reference frames. During encoding, the encoder may determine the location of a block within a frame. The level of compression may be improved by searching for blocks at a fractional pixel level using sub-pixel or fractional interpolation. The smaller the fraction, the higher compression the encoder achieves, but the more computationally-intensive the encoding algorithm. For example, interpolation may be performed to generate fractional or sub pixel values (e.g., half and quarter pixel values), and the encoding algorithm may use different levels of precision based on the content. For more detailed frames or block within frames, the encoding algorithm may utilize a smaller sub-pixel value, e.g., quarter, which would require interpolating pixel values at quarter pixel locations. For less detailed frames or blocks within frames, the encoding algorithm may utilize interpolation at half pixel values. In this example, interpolating quarter pixel values may provide better motion estimation but is more computationally-intensive than interpolating half pixel values. In blurry frames, images have less detail in them, and as a result, interpolating at a sub-pixel level may not be essential to preserve details of the image. Therefore, integer pixel precision may be utilized to encode motion estimation blocks, where the encoding algorithm looks that pixel values, thus avoiding the added computational complexity of interpolating pixel values. Video encoder 110 may compare the estimated blurriness level B(n) of a frame with a threshold value in B(n) evaluation unit 114, to determine whether to implement a simplified encoding algorithm. In one example, the threshold value may be set to a default value. In another example, the threshold value may be changed based on settings in video capture device 102 and/or video encoder 110. In another example, the threshold value may be defined by a user of the system. For example, the blurriness level may be a value in the range [0,1], and by default, the threshold value may be set to 0.5, or the midpoint of the blurriness level range of values. In other examples, the threshold value may be set by user preference. If B(n) evaluation unit 114 determines that the estimated blurriness is above the threshold, B(n) evaluation unit 114 signals to encoding algorithm unit 116 to implement the appropriate simplified algorithm to encode the blurry frames.

Figure 2:
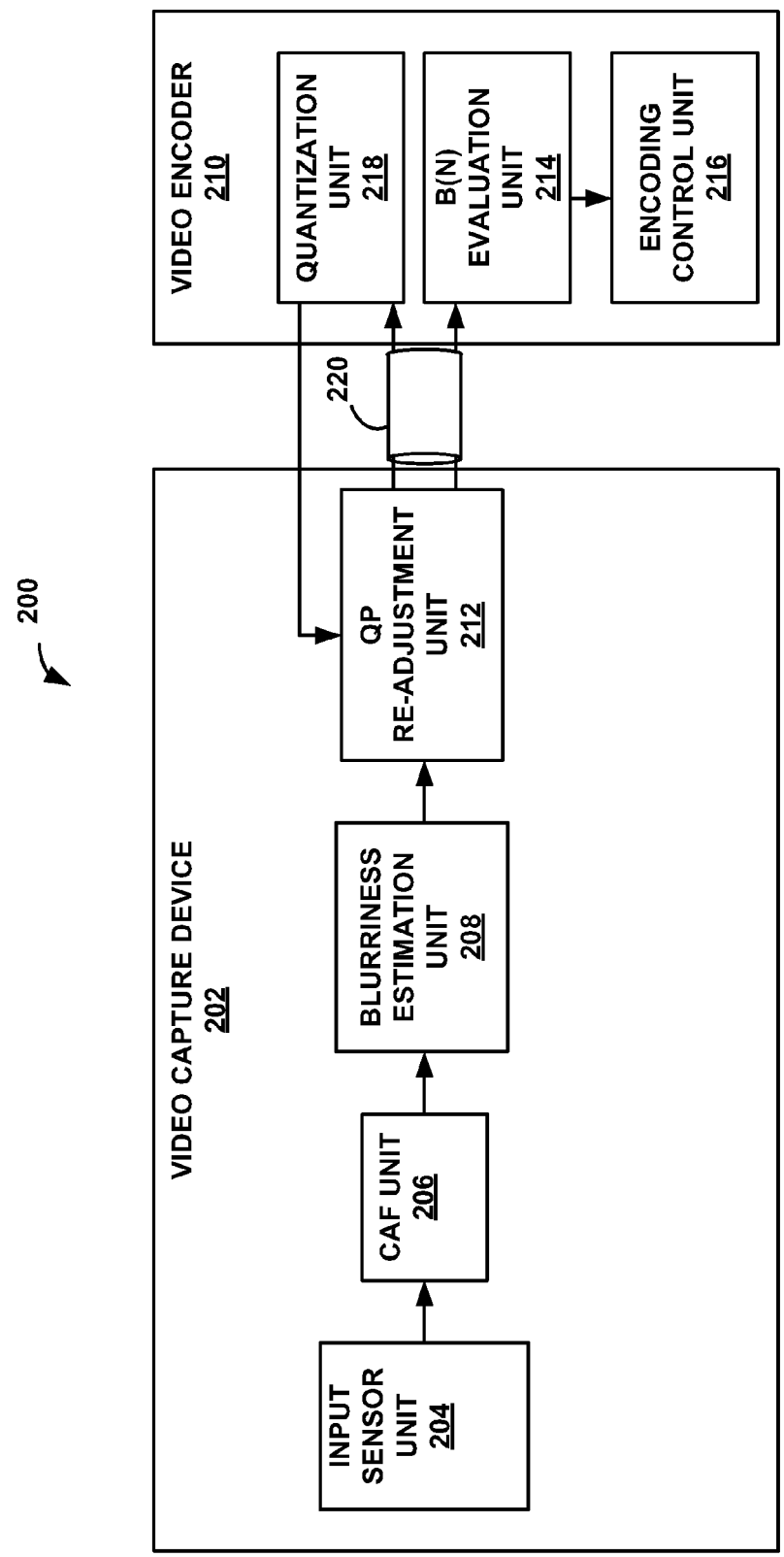
FIG. 2 is a block diagram illustrating another exemplary video capture device and video encoder system that may implement techniques of this disclosure.

FIG. 2 is a block diagram illustrating another exemplary video capture device and video encoder system 200 that may implement techniques of this disclosure. The example of FIG. 2 substantially corresponds to the example of FIG. 1, but a portion of the calculation that the video encoder performs in FIG. 1 may be performed in the video capture device 202 in FIG. 2, as will be discussed in more detail below. As shown in FIG. 2, system 200 includes a video capture device 202, e.g., video camera that captures and sends a video stream to video encoder 210 via link 220. Video capture device 202 and video encoder 210 may comprise any of a wide range of devices, including mobile devices. In some examples, video capture device 202 and video encoder 210 comprise wireless communication devices, such as wireless handsets, personal digital assistants (PDAs), mobile media players, cameras, or any devices that can capture and encode video data. In some examples, video capture device 202 and video encoder 210 may be contained in the same enclosure as part of the same system. In other examples, video capture device 202 and video encoder 210 may reside in two or more different devices, and may be part of two or more different systems. If video capture device 202 and video encoder 210 reside in two or more different devices, link 220 may be a wired or wireless link.

In the example of FIG. 2, as in the example of FIG. 1, video capture device 202 may include an input sensor 204, a CAF unit 206, and a blurriness estimation unit 208. In addition, in this example, video capture device 202 includes a QP re-adjustment unit 212. Video encoder 210 may include quantization unit 218, frame blurriness evaluation unit 214, and encoding algorithm unit 216. In accordance with this disclosure, video capture device 202 may be configured to estimate the level of blurriness of frames, and based on the estimated level of blurriness, readjust the QP. Video capture device 202 may receive from video encoder 210 the previous QP value, based on which, video capture device 202 may computer the readjusted QP value. In one example, the readjusted QP value may be based on the level of blurriness in a frame, and encoding less blurry frames may utilize more quantization (e.g., smaller QP) and more blurry frame may utilize less quantization (e.g., larger QP), where the readjusted quantization may not exceed the previous amount of quantization used by video encoder 210. Video capture device 202 may send the readjusted QP and the blurriness estimate to the video encoder 210. Video encoder 210 may use blurriness information to determine appropriate video encoding data rate and/or simplify video encoding algorithms. Video encoder 210 may use the readjusted QP during quantization. In this example, adjusting the QP based on the blurriness level estimate may further reduce computational complexity in video encoder 210. Video encoder 210 may further readjust the QP based on factors other than blurriness.

Input sensor 204 of video capture device 202 may sense frame contents for capturing. Changes in the captured scene may result in the input sensor 204 sending a signal to the CAF unit 206, and triggering a refocus process, as described above in connection with FIG. 1. CAF unit 206 may send an indication to the blurriness estimation unit 208 indicating that CAF unit 206 is performing the refocus process. The blurriness estimation unit 208 may estimate the blurriness in frames while refocusing is occurring. The blurriness estimation unit 208 may estimate a blurriness B(n) associated with frame n, and send B(n) to QP re-adjustment unit 212. QP re-adjustment unit 212 may utilize the blurriness level to re-adjust the QP for the frame as described above. Video capture device 202 may send the blurriness estimate B(n) and the adjusted QP for frame n to video encoder 210.

Video encoder 210 may receive the blurriness estimate B(n) and adjusted QP for frames with blur, and may utilize the blurriness level in encoding the video frames, e.g., without having to perform additional calculations to determine the amount of blur in the frames, in some examples. In one example, video encoder 210 may utilize the readjusted QP to quantize the coefficient values associated with residual data for blocks in frame n, in quantization unit 218.

In addition to utilizing the readjusted QP, video encoder 210 may utilize the blurriness level to further simplify the encoding algorithm implemented by video encoder 210. A simplified encoding algorithm may be, for example, an algorithm that uses integer pixel precision, instead of fractional, for motion estimation search, as discussed above. Other encoding algorithm simplifications may involve, for example, utilize skip mode, modifying the reference picture list used in motion estimation, and modifying block partition size for prediction code and motion compensation, as explained in more detail below. In one example, video encoder 210 may determine which of the encoding algorithm simplification methods to use based on the estimated blurriness level. In one example, video encoder 210 may implement one or more methods of encoding algorithm simplification, as further discussed below. Video encoder 210 may compare the estimated blurriness level B(n) of a frame with a threshold value in B(n) evaluation unit 214, to determine whether to implement a simplified encoding algorithm and which ones to implement. In one example, the threshold value may be set to a default value. In another example, the threshold value may be changed based on settings in video capture device 202 and/or video encoder 210. In another example, the threshold value may be defined by a user of the system. If B(n) evaluation unit 214 determines that the estimated blurriness is above the threshold, B(n) evaluation unit 214 signals to encoding algorithm unit 216 to implement the appropriate simplified algorithm to encode the blurry frames.

Figure 3:
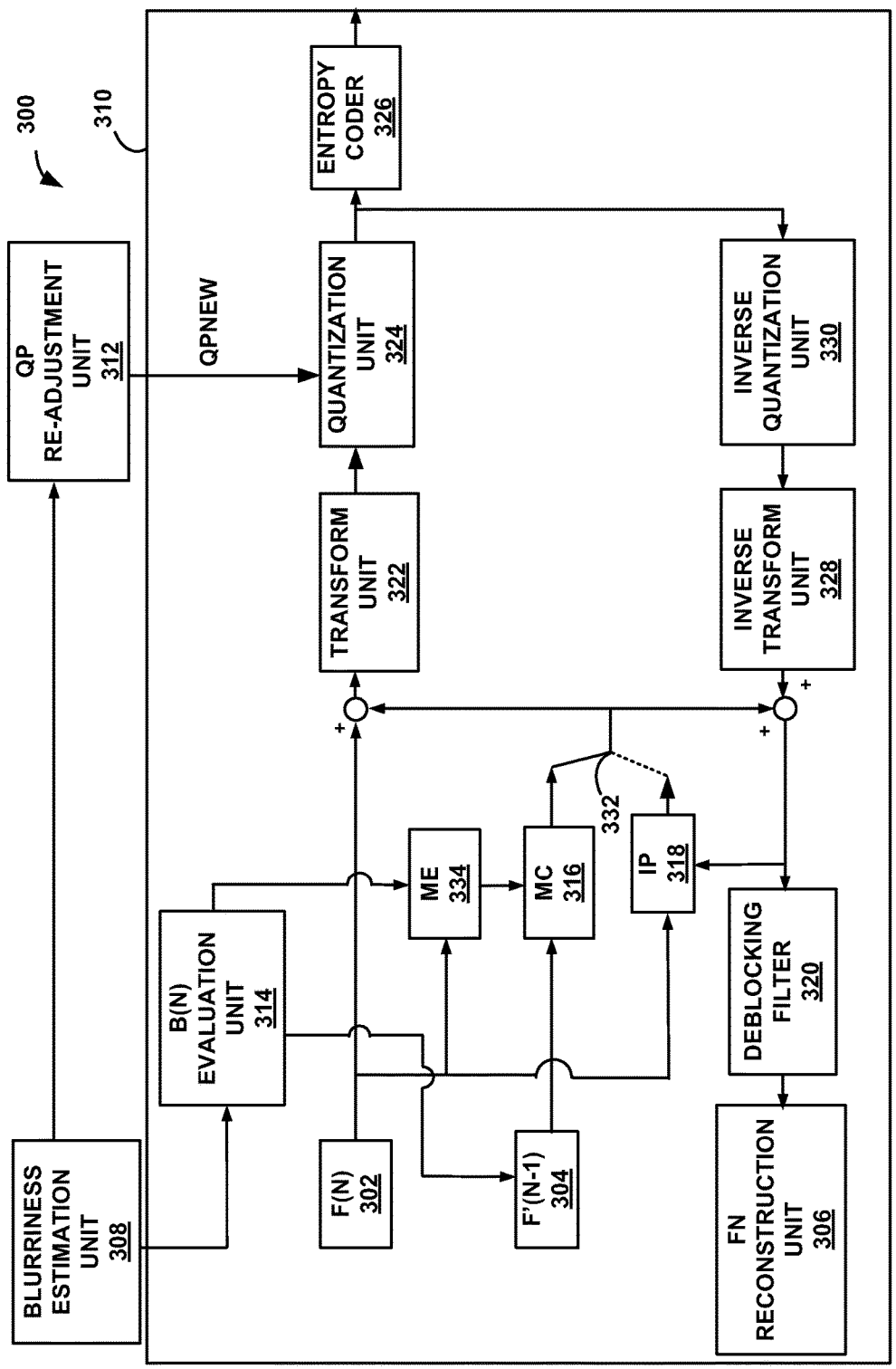
FIG. 3 is a block diagram illustrating an example of a video encoder system that may implement techniques of this disclosure.

FIG. 3 is a block diagram illustrating an example of a video encoding system 300 that implements techniques of this disclosure. As shown in FIG. 3, system 300 includes video encoder 310 in addition to blurriness estimation unit 308 and QP re-adjustment unit 312. Blurriness estimation unit 308 may be an example of blurriness estimation unit 108 of FIG. 1 or blurriness estimation unit 208 of FIG. 2. In one example, QP re-adjustment unit 312 may be part of video encoder 310. In this example, video encoder 310 may be an example of video encoder 110 of FIG. 1. In another example, QP re-adjustment unit 312 may not be part of video encoder 310. In this example, video encoder 310 may be an example of video encoder 210 of FIG. 2. Video encoder 310 includes elements of a conventional video encoder in addition to elements that implement techniques of this disclosure. The video encoding system 300 may encode video frames captured by a video capture device, e.g., video capture device 102 of FIG. 1 or video capture device 202 of FIG. 2. F(n) 302 may represent a current frame that the video encoder is processing for encoding.

During its usual operation, i.e., while the frames are in focus and no refocusing is taking place in the video capture device, the video encoder 310 may perform motion estimation on the current frame, if video encoder 310 is operating in inter-frame prediction mode. Alternatively, video encoder 310 may perform intra-frame prediction on the current frame, if operating in intra-frame prediction mode. Using selector 332, video encoder 310 may switch between inter-frame prediction and intra-frame prediction. For example, if the estimated level of blurriness in a frame exceeds a certain threshold, video encoder 310 may operate in inter-frame prediction mode by using selector 332 to activate the motion compensation unit 316. When operating in inter-frame prediction mode, video encoder 310 may utilize motion vector data for motion compensation, in addition to residual data representing the difference between the inter-frame prediction data and the current frame, as will be described in more detail below.

In one example, video encoder 310 may be operating in intra-frame prediction mode. The intra-frame prediction data may be subtracted from the current frame 302 to produce residual data, and the result may undergo a transform in transform unit 322, e.g., discrete cosine transform (DCT), to produce transform coefficients representing the residual data. The transformed frame data, e.g., transform coefficients, may then undergo quantization in quantization unit 324. The video encoder 310 may have a default QP that ensures a certain image quality, where a higher degree of quantization retains more detail in an encoded frame, but results in a higher data rate, i.e., a higher number of bits allocated to encode residual data for a given frame or block. The quantized frame data may then go through entropy coding unit 326 for further compression. The quantized frame may be fed back to inverse quantization unit 330 and inverse transform unit 328, and may combine with the result from the intra-frame prediction unit 318, to obtain an unfiltered signal. The unfiltered signal may go through deblocking filter 320, which results in a reconstructed frame, F(n), which may be used as a reference frame for encoding other frames.

In one example, input sensors, e.g., input sensors 104 of FIG. 1 or 204 of FIG. 2, of the video capture device, e.g., video camera, may detect when a new object of interest comes into the scene being captured or the user may re-direct the input sensor to capture a different object or different scene. Detecting a new object may cause the video capture device to initiate refocusing to reestablish focus on the new object. Refocusing may entail adjusting the lens position until the desired focus is achieved. During refocusing, captured frames may not have the desired focus, and as a result may be blurry. Video encoding system 300 may exploit the blurriness of frames to reduce the encoding data rate for blurry frames and/or simplify encoding algorithms applied to the blurry frames.

In accordance with techniques of this disclosure, the blurriness estimation unit 308 in the video capture device may estimate the blurriness, B(n), of frames F(n). A video capture device, e.g., device 102 of FIG. 1 or device 202 of FIG. 2, may estimate the blurriness level of a frame in blurriness estimation unit 314. The video capture device may send the estimated blurriness level to a QP re-adjustment unit 312, where the QP value is readjusted based on the estimated blurriness level, as described above. In one example, QP re-adjustment unit 312 may be in the video capture device, as shown in FIG. 2. In another example, QP re-adjustment unit 312 may be in video encoder 310, as shown in FIG. 1. QP re-adjustment unit 312 may re-adjust the QP value based on the estimated blurriness level. Video encoder 310 may re-adjust the QP value further based on other factors.

The video capture device may also send the estimated blurriness level to video encoder 310, where a frame blurriness evaluation unit 314 compares the estimated blurriness level B(n) with a threshold value, to determine whether to implement a simplified encoding algorithm. As FIG. 3 shows, if B(n) is above the threshold, blurriness evaluation unit 314 sends a signal to the motion estimation unit 310 to use a simplified encoding algorithm. In one example, simplification of encoding may include, for example, adjusting the pixel precision level as to require no or a smaller sub-pixel interpolation (e.g., ½ instead of ¼ or smaller) of pixels in motion estimation block search, which results in reducing the amount of data to be coded. For example, if the estimated blurriness level exceeds a threshold, video encoder 310 may selectively activate an integer pixel precision motion estimation search instead of fractional pixel precision motion estimation search. In this example, instead of expending computing resources to interpolate fractional pixels within a reference frame, video encoder 310 may rely on integer pixel precision and performing no interpolation. By using integer pixel precision, video encoder 310 may select a predictive block that is less accurate than a block selected using fractional pixel precision. For a frame that is already blurry, however, the reduced precision may not significantly impact image quality. Consequently, integer precision may be acceptable. By eliminating the need to perform sub-pixel interpolation, video encoder 310 performs less computations, which results in using less system resources such as power, and reduces processing time and latency during encoding. In another example, simplification of encoding may involve adjusting block partition levels by using larger blocks within the frame for motion estimation. For example, in the H.264 standard frames may be partitions into blocks of size 16×16, 8×16, 16×8, 8×8, 8×4, 4×8, and 4×4. For example, if the estimated blurriness level exceeds a threshold, video encoder 310 may select a larger block partition, e.g., 16×16 to for motion estimation search. In this example, video encoder 310 uses less blocks for encoding a more blurry frame, than when encoding a frame that is less blurry, because each frame will be made up of less blocks and therefore, less motion vectors will be encoded for the frame. By using larger block partitions, and therefore, less blocks per frame, video encoder 310 encodes less motion vectors, which results in using less system resources. In yet another example, simplification of encoding may include operating in skip mode, where video encoder 310 skips frames without encoding them, e.g., video encoder 310 discards these frames. If the estimated blurriness level exceeds a threshold for a sequence of frames, video encoder 310 operates on the assumption that the blurriness level is so high that a group of consecutive frames will look substantially identical. As a result, video encoder 310 may encode one of the blurry frames whose estimated blurriness level is above a certain threshold, and skip encoding of the other substantially identical frames. When the captured video is subsequently decoded and/or displayed, the one encoded frame may be decoded once, and repeated for display in place of the skipped frames. By using skip mode, video encoder 310 encodes one frame instead of a group of frames, therefore reducing the amount of computation needed to encode a video sequence, and reducing the amount of power consumed during encoding. Additionally, encoding one frame instead of a plurality of frames reduces processing time and latency during the encoding process. Video encoder 310 may also utilize skip mode with encoding blocks within frames if the estimated blurriness level is above a threshold, where video encoder 310 encodes one block and uses the encoded block in place of other blocks that may be indistinguishable because of the level of blurriness.

If B(n) is above the threshold, blurriness evaluation unit 314 also sends a signal to the reference frame unit 304. The reference frame unit 304 may set the reference frame for F(n) to the previous frame, F(n−1). The reference frame unit 304 send the information to the motion compensation unit 316, which may perform motion compensation in the current blurry frame using inter-prediction mode, i.e., using data from other frames frame, instead of the current frame. Therefore, blurriness level B(n) may control selection 332 between inter mode and intra mode for prediction. The inter-frame prediction data may be subtracted from the current frame 302, and the result may undergo a transform 322, e.g., discrete cosine transform (DCT).

In accordance with techniques of this disclosure, the estimated blurriness level may be sent to the QP readjustment unit 312, which may be in the video encoder (FIG. 1) or in the video capture device (FIG. 2). QP re-adjustment unit 312 adjusts the QP based on the amount of blurriness B(n) in the frame. In one example, if the estimated blurriness level is above a threshold, then the QP value is re-adjusted. In another example, the level of blurriness in a frame is evaluated and the QP value is readjusted based on the level of blurriness in the frame, where the amount of re-adjustment is proportional to the severity of blurriness in the frame.

In one example, the blurriness in a frame may not be too severe, and as a result, readjustment of the QP may not be preferred. As a result, quantization may be performed using the default QP value, when the estimated blurriness level does not exceed a threshold value. In another example, the QP readjustment unit 312 may determine, based on the estimated blurriness level B(n), if a certain amount of blurriness is present in the frame, to increase the QP, when the estimated blurriness level exceeds a threshold value. As the QP increases, the video encoding rate drops, but some of the detail gets lost, and the image may become more distorted. In blurry images, details of the images are already distorted, and increasing the level of quantization may have little perceivable effect on the quality of the image. The QP readjustment unit 312 may send the adjusted QP, QPnew, to the quantization unit 324. The quantization unit 324 may use QPnew to quantize the transformed residual frame data, e.g., residual data transform coefficient values, received from the transform unit 322. The quantized frame data may then go through entropy coding 326 for further compression, storage, or transmission of the encoded data. The encoder may feed back the quantized residual transform coefficient data to inverse quantization unit 330 and inverse transform unit 328, and may combine with the result from the inter-frame prediction 316, to obtain reconstructed data representing a frame or a block within a frame. The reconstructed data may go through deblocking filter 320, which results in a reconstructed frame, F(n).

Figure 4:
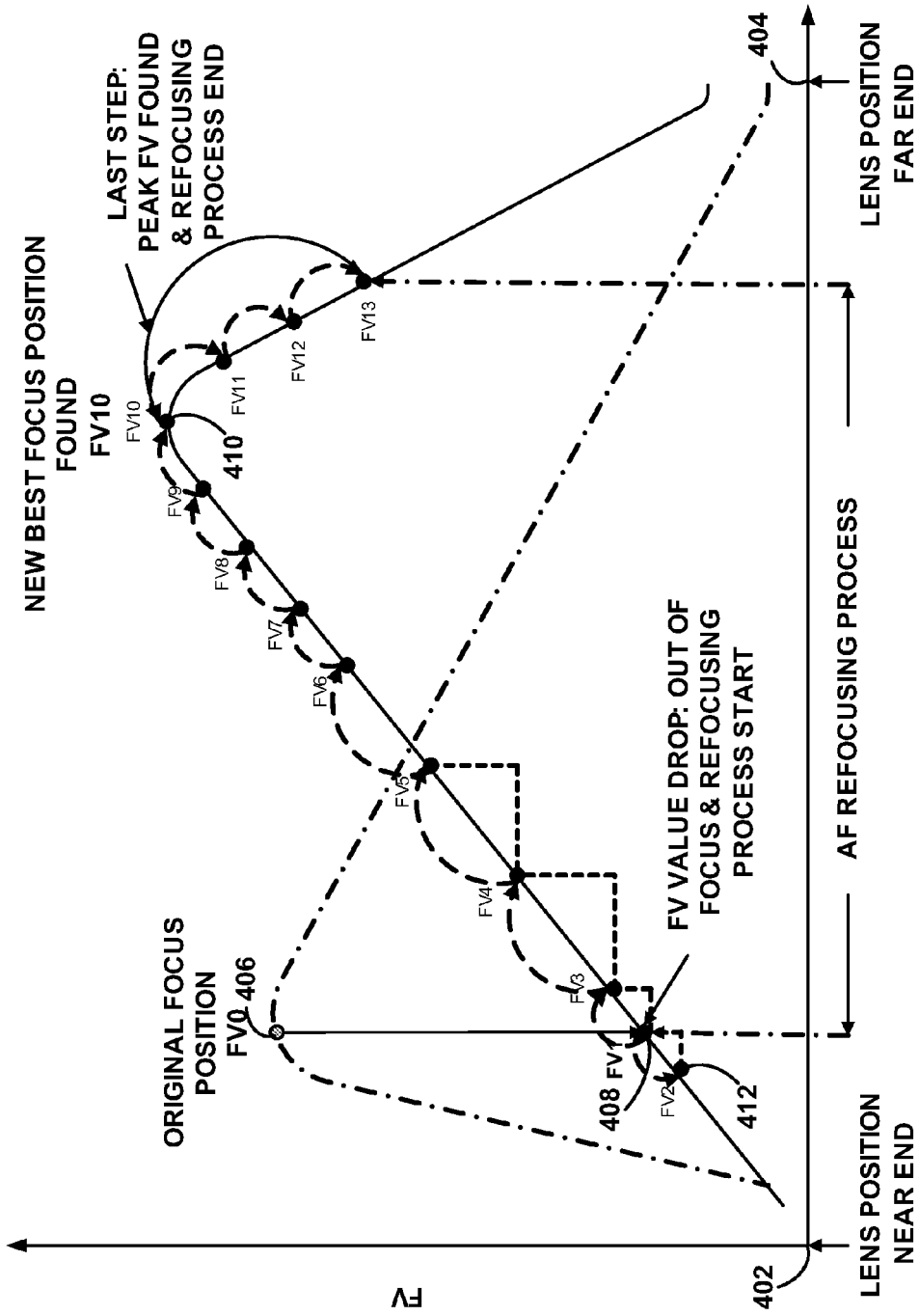
FIG. 4 is a diagram illustrating performance of an example auto-focus refocusing process by a video capture device.

FIG. 4 is a diagram illustrating an example auto-focus refocusing process, which may be referred to as a CAF process. In one aspect of this disclosure, the CAF functionality may be implemented in the video capture device, e.g. video capture device 102 of FIG. 1 or video capture device 202 of FIG. 2. The CAF process may be, for example, a passive auto-focus algorithm, which may include, among other functionalities, a contrast measure and a searching algorithm, which may be performed by CAF unit 106 (FIG. 1) or 206 (FIG. 2). The contrast measure may be based on the focus value (FV) obtained by high pass filtering the luma values over a focus window in the captured frame. The auto-focus algorithm may determine that the best or an optimal focus is achieved when the highest contrast is reached, i.e., when the FV peaks. The CAF unit may implement the searching algorithm to adjust the lens position in the direction of reaching the highest or most optimal contrast, i.e., where FV peaks, such that the best or an optimal focus may be achieved within a frame.

As shown in FIG. 4, the focus value (FV) may be plotted as a function of lens position. The range of lens position may represent the range of the lens of a video capture device, e.g., a video camera, ranging from a near end lens position (402) to a far end lens position (404). A frame at an optimal focus may have a peak focus value of FV0 (406). In this example, a new object may come into the frame resulting in a signal that triggers CAF unit 106 or 206 to initiate the refocus the process. At that point, the focus value of the frame may drop from FV0 (406) to FV1 (408), while the lens position has not yet begun to change. The lens position may then be adjusted step-by-step, until a new optimal or peak focus value is reached. In this example, the optimal focus value may be FV10 (410), at a new lens position. During the refocus process, the video capture device system may determine the focus value at each lens position until the optimal value is achieved. In determining the searching direction, i.e., whether the lens position is to go towards the near end (402) or the far end (404), when refocus is triggered, the searching direction may be estimated by finding the direction in which the FV increases. In this example, the first value of the refocus process may be FV1 (408). In the next step, the lens position may go towards the near end (402), and the corresponding focus value FV2 (412) may be determined, which in this case may be less than FV1 (408). Since FV2 (412) is less than FV1 (408), the video capture device system determines that the search direction should be towards the far end (404) of the lens position, thus, away from FV2 (412).

With every change in the lens position, a frame is captured, and the focus value is determined, as illustrated by FV3-FV9. In one example, when FV10 (410) is reached, the lens position may continue changing in the same direction, in this example toward the far end position (404), until a specific number of steps in a row gives a lower focus value than one already reached. For example, FV10 (410) is reached, and in this system the number of extra steps may be set to three. As a result, the lens position may increase three more steps resulting in FV11, FV12, and FV13, all lower than FV10 (410). The video capture device may then determine that FV10 (410) may be the new optimal focus value and return to the lens position corresponding to FV10 (410).

As mentioned above, the blurriness level may be determined for every frame captured between FV1 (408) and until FV10 (410) is allocated as the new best focus value. The blurriness level at each step may be utilized as described above, i.e., to determine whether to readjust the QP for encoding the associated frame and, in some cases, to determine how much to adjust the QP. The level of the blurriness of a frame may be also compared to a threshold to determine whether to simplify the encoding algorithm for the frame.

In one example, the blurriness level of a frame may be determined based on the focus value of the frame and the focus value of the preceding frame. The initial blurriness level B(1) may be estimated based on the percentage of the focus value change after the initial drop, i.e., from FV0 (406) to FV1 (408), compared to the original focus value, i.e., FV0, as follows:

$$B_1 = \frac{|FV_1 - FV_0|}{FV_0}$$

When the searching direction is determined, as discussed above, the lens may be adjusted step-by-step to achieve the best focus position. The blurriness during this process may be evaluated as follows:

$$B_i = K\frac{G_i}{FV_i} \quad \begin{cases} \text{if } B_i < 0, & B_i = 0 \\ \text{if } B_i > 1, & B_i = 1 \end{cases} \quad B_i \in [0, 1] \quad i = 1, 2, \ldots$$

where K may be an adjustable constant used to normalize the blurriness level to a selected range, e.g., [0,1]. Bi is estimated blurriness level for frame i and FVi is the focus value associated with frame i. In one example, the default value of K may be FV1, because FV1 is the initial FV value when the refocusing process starts. By setting K to FV1, the blurriness level during the refocusing process is normalized to the initial FV value, which results in normalizing the blurriness level to the range [0,1]. Gi is the absolute value of the gradient and may be computed as follows:

$$G_i = \left|\frac{FV_i - FV_{i-1}}{LensP_i - LensP_{i-1}}\right|$$

where LensPi is the lens position corresponding to FVi, the focus value of the current frame, and LensPi−1 is the lens position corresponding to FVi, the focus value of the previous frame.

In one example, when the peak value of $FV_N$ is determined, the refocus process may end, and the blurriness may be reset to its initial value indicating that the frame is in focus. In this example, the blurriness may be reset to zero, $B_N=0$.

In one example of this disclosure, CAF may not run for each frame. If there is a frame skip during the refocusing process, the blurriness level for skipped frames may be kept the same as a previously-computed one:

$$B_i=B_{i-1}$$

In one aspect of this disclosure, the blurriness as described above may be determined in real-time, and may enable real-time or substantially real-time encoding where blurriness levels may be utilized to control video data rate and/or simplification of encoding algorithms.

In another aspect of this disclosure, blurriness may be evaluated during CAF refocusing with a delay. The blurriness B[i] for a frame i may be estimated during CAF refocusing process by evaluating the lens position difference between the lens position of the new focal plane and the previous lens position during the refocusing process, e.g., as indicated by the following equation:

$$B[i]_{WithDelay}=k|\text{LensPosition}[N]-\text{LensPosition}[i]|$$

N is the index of the lens position at the end of the refocusing process, when the new focal plane may be found, and i=0, . . . , (N-1). k is an adjustable constant, LensPosition[i] is the lens position associated with the new focal plane, and LensPosition[N] is the lens position associated with the previous refocusing process.

In one example, it may be desired to limit the value of the blurriness level to a certain range, and the value of the constant k may depend on the defined range. For example, the blurriness level may be limited to the range [0,1], and in such an example $$k = \frac{1}{|LensFarEnd - LensNearEnd|}$$

Where LensFarEnd is the maximum lens position, and LensNearEnd is the minimum lens position.

In an example where the blurriness may be evaluated on a delayed basis, the distance from the current lens position to the desired lens position, i.e., the lens position corresponding to the best focus, may be evaluated more accurately once the best focus position is determined. In this example, the blurriness may be only determined for the frames in between the initial position and the best focus position.

During the CAF refocusing process, blurriness may be evaluated at each searching step, frame-by-frame. The QP for encoding the current frame may be readjusted for data rate saving according to the estimated blurriness level of the frame content. In one example, the more blurry a frame is, the less quantization used to encode the corresponding frame, since less sharp edge information and less detail may be in the frame. In some examples, the degree of quantization may be proportional to the QP value. In some examples, the degree of quantization may be inversely proportional to the QP value. In either case, the QP value may be used to specify the degree of quantization. Therefore, a lower encoding data rate may be allocated for the more blurry frames. The resulting savings in coding rate may be used, in some examples, to allocate more coding bits to non-blurry frames, or frames with less blurriness.

In one example, the QP re-adjustment may be determined by the QP readjustment unit 112 (FIG. 1) or 212 (FIG. 2) as follows:

$$QP_i^{new} = QP_0^{org} + a \times \frac{QP_{max} \times B_i}{QP_0^{org}}$$

$QP_{max}$ may be the maximum QP value allowed in a particular video encoding system. In this example, quantization may be proportional to the QP value, e.g., as in H.264 encoding. For example, in H.264, $QP_{max}$=51;

$QP_i^{new}$ may be the new QP value corresponding to $FV_i$ after re-adjustment;

$QP_0^{org}$ may be the initial QP at $FV_0$ applied for encoding the frames by video encoder;

$B_i$ may be the blurriness level corresponding to $FV_i$ during the refocusing process; and a may be a constant parameter selected in a range defined as appropriate for the system design, and used to normalize the change in QP, such that $QP^{new}$ remains in a set range, which may be standard-dependent. For example, in H.264, the range for QP values is [0,51]. In one example a may be in the range [0,10], and 10 may be the default value. The value of a may be selected by the user based on how much bit reduction the user desires to implement for blurry frames.

In one example, QP readjustment may be applied during the refocusing process. When refocusing is complete, the QP may be reset to the original QP value $QP_0^{org}$. In one example, during refocusing, each new QP value may be computed independently from the previously-computed QP value.

In one example, aspects of the disclosure may be used with an H.264 video encoding system. H.264 video encoding has achieved a significant improvement in compression performance and rate-distortion efficiency relative to existing standards. However, the computational complexity may be enhanced due to certain aspects of the encoding, such as, for example, the motion compensation process. H.264 supports motion compensation blocks ranging from 16×16 to 4×4. The rate distortion cost may be computed for each of the possible block partition combinations. The block partition that may result in the smallest rate distortion performance may be selected as the block partition decision. In the motion compensation process, the reference frames may be as many as 16 previously encoded frames, which may also increase the computational complexity of a system. In H.264 video encoding, prediction as small as ¼ or ⅛ sub-pixel prediction may be used, and interpolation methods may be used to compute the sub-pixel values.

Figure 5:
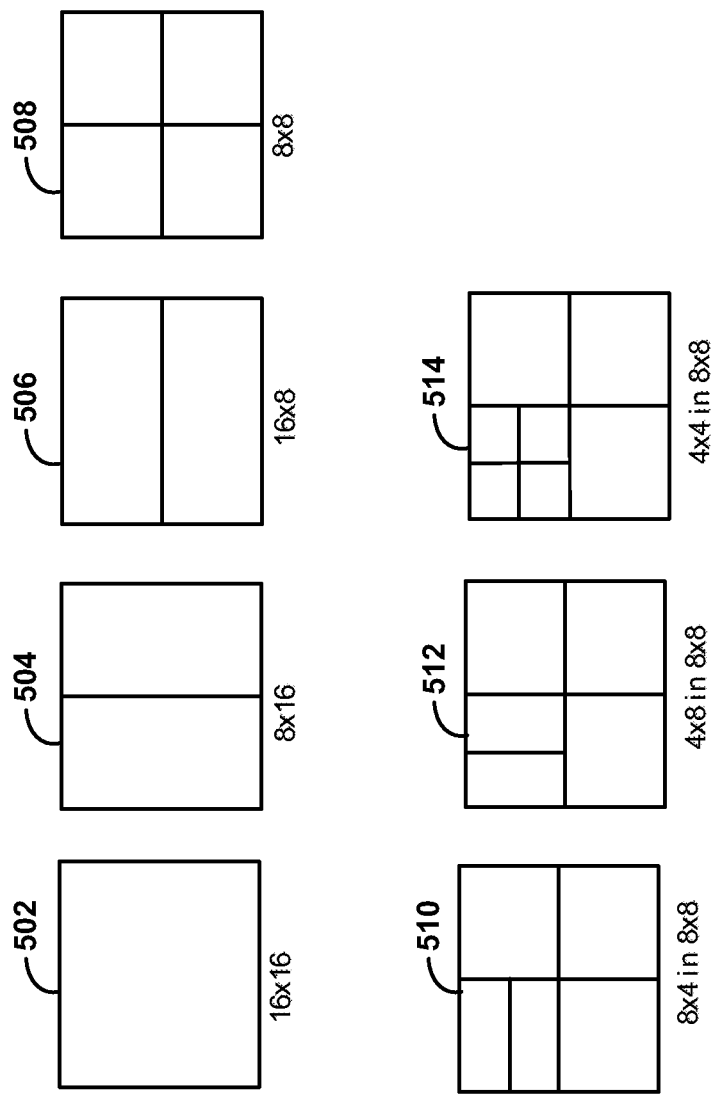
FIG. 5 is a diagram illustration exemplary block partition sizes for motion estimation during encoding.

As discussed above, in H.264 video encoding, block partitions may range from 16×16 (502) to 4×4 (514), in any combination, as illustrated in FIG. 5. For example, once 8×(508) block partition is selected, each 8×8 block may have partition choice of 8×4 (510), 4×8 (512), or 4×4 (514).

In one example, the video encoding algorithm of a video encoder may be simplified based on the blurriness level during CAF refocusing. The blurriness level may be estimated using at least one of the methods described above. The estimated blurriness level may be compared to a predefined block partition threshold value:

$$B_i \geq \text{Threshold}_{BlockPartition}$$

Where Bi is the estimated blurriness level of frame i, and Threshold_blockpartition is a threshold value based on which the block partition level may be adjusted. The threshold value may be adjusted to be a value within a range, e.g., [0,1], according to a user's preference or the system requirements, for example. The higher the threshold value, the higher the blurriness level required to trigger simplification of the encoding algorithm.

In one example, if the estimated blurriness level exceeds the threshold value, video encoder 310 (FIG. 3) may select a larger block partition, e.g., 16×16 (502), 16×8 (506), 8×16 (504), and 8×8 (508), therefore decreasing the amount of motion compensation the video encoder needs to encode for a given frame or group of frames. The use of larger block partitions means that each frame is divided into larger blocks, and therefore, a smaller number of blocks per frame the video encoder will encode. As a result, the video encoder will encode less motion vectors, and will as a result use less system resources, e.g., power and memory. In one example, the video encoder may select a block partition based on the severity of blurriness in a frame. For example, larger block partition, e.g., 16×16, 16×8, or 8×16, may be used for frames with a high level of blurriness, and a slightly smaller block partition, e.g., 8×8, may be used for frames with a lower level of blurriness. If the blurriness level exceeds the threshold, the smaller block partitions, e.g., 8×4, 4×8, and 4×4, may be eliminated from consideration, and based on the severity of the blurriness, one of the larger block partitions may be selected as described above.

In another example, the encoding algorithm simplification may be achieved by limiting the range of frames from which the video encoder selects a reference frame. Using a threshold value associated with reference frame selection, the video encoder may narrow down reference frame choices to only the previous encoded frame:

$$B_i \geq Threshold_{Reference}$$

Where Bi is the estimated blurriness level of frame i, and Threshold_reference is a threshold value based on which the reference picture list may be adjusted. In video encoding, when encoding a frame, a reference frame may be selected from a reference picture list for motion estimation purposes. The video encoder may determine the most appropriate reference frame, and search it to a current frame to encode motion estimation data. In one example, if the estimated blurriness level in a frame exceeds a threshold, the video encoder may limit the reference picture list to a subset of frames, such as, for example, the frame preceding the current blurry frame.

By utilizing blurriness estimation, the skip mode, e.g., in H.264, may be signaled when the blurriness level is higher than a pre-defined threshold. The selection activation of skip mode may also reduce the encoding data rate. Using a threshold value associated with the frame skip mode, the video encoder may determine to activate the skip mode:

$$B_i \geq Threshold_{FrameSkip}$$

Where Bi is the estimated blurriness level of frame i, and Threshold_frameskip is a threshold value based on which the frame skip mode may be activated. In one example, if the estimated blurriness level exceeds threshold for frame skip mode, the video encoder may activate skip mode, and the frame may be skipped (i.e., discarded) without encoding. In one example, the threshold for frame skip may be larger than the threshold for other encoding algorithm simplification techniques, e.g., pixel precision level, block partition level, and reference picture list modification. In one example, the estimated blurriness level for a frame may be first compared to the frame skip threshold, such that, if the blurriness level exceeds the threshold, and the frame is to be skipped, the video capture device need not perform the other comparisons to thresholds, as the video encoder need not encode anything associated with the frame. In one example, comparison of the estimated blurriness level to the various thresholds may be performed in a specific order, based on the order of progression of the simplification algorithms. For example, modification of the reference picture list may be performed prior to partition block level and pixel precision level determinations.

In another example, blurriness estimation during refocusing may be used to signal the frames that may have blurry content so that the video encoder implements and applies a de-blurring algorithm to these frames. The video encoder may not have to make the determination that the frame is blurry, and just apply the de-blurring algorithm when it receives a signal from the video capture device indicating presence of blurry content. In another example, the estimated blurriness level may be used to determine the amount of de-blurring needed for a blurry frame, where based on the level of blurriness, the video encoder selects a corresponding de-blurring algorithm, or defines corresponding parameters used by the de-blurring algorithm. In this manner, the video encoder may apply different de-blurring levels according to the level of blurriness in the frame.

In accordance with this disclosure, the video encoder may not have access to refocusing statistics (e.g., FV values, lens positions), and may therefore, be incapable of determining the amount of blur in frames based on refocusing statistics. As a result, the video encoder may need to perform more computationally-intensive calculations to determine blurriness in frames. Using aspects of this disclosure, a video capture device may estimate blurriness levels during refocusing and send the blurriness levels to video encoder. In the examples described herein, different strategies may be utilized to evaluate blurriness level during refocusing. In one example, QP re-adjustment may be used in video encoding to better control and decrease video data rate based on the blurriness level during refocusing. In one example, video encoding algorithm simplification may be improved using estimated blurriness. In another example, a video capture device may estimate blurriness to identify blurry frames and their blurriness level caused by CAF refocusing. The video capture device may send the blurriness information to the video encoder, which may apply de-blurring techniques to de-blur frame content.

In an example of this disclosure, computation of the discussed algorithms may utilize less computing resources, resulting from several factors. For example, CAF statistics such as blurriness indicated by FV may have already been processed in the video capture device itself, as part of the AF process. Therefore, little or no extra computation may be needed to compute, for example, lens positions and the focus values, in the encoder. Also, for example, blurriness level estimation may involve simple subtraction, division, and multiplication with a constant parameter for the computation. Furthermore, for example, computation of QP re-adjustment during CAF refocusing may be simple and straight forward without requiring too much additional computational complexity to the video encoder, or if done in the camera system, may reduce some computations from the encoder side. The techniques and methods described above may be useful in informing the video encoder of blurry frame content without causing delays with extra computations in the video encoder. Additionally, in certain circumstances, as discussed above, the computational complexity of motion compensation may be significantly reduced by identifying blurry frame content without causing delays, in addition to efficiently reducing the encoding data rate.

FIGS. 6A-6C are flow diagrams illustrating control of video encoding using estimate of blurriness levels in captured frames in accordance with example techniques of this disclosure. The process of FIG. 6 may be performed in a video system by a front-end device, e.g., a video capture device or video camera, and a back-end device, e.g., video encoder. Different aspects of the process of FIG. 6 may be allocated between the video capture device and the video encoder. For example, QP readjustment may be performed in the video encoder (FIG. 1) or the video capture device (FIG. 2).

As shown in FIG. 6, a video capture device 102 (FIG. 1) with CAF, may be capturing frames and sending them to a video encoder 110 (FIG. 1). The video capture device may determine based on a drop in the focus value of a captured frame that a change has occurred in the frame resulting in reduced focus (602). The video capture device may have an input sensor unit 104 (FIG. 1) that captures the video frames, and determines when the focus value of the captured frame has dropped, therefore, indicating possible blurriness in the frame. The drop in focus may be caused by a new object coming into or moving out of or around the scene or new scene resulting from the user of the video capture device, either intentionally or unintentionally, redirecting the video capture device toward the new object or scene. The input sensor unit may determine based on the captured frame the FV of the frame, and compares it to the previous frame FV. When the FV drops, the input sensor unit may signal the detected drop to a CAF unit 106 (FIG. 1) within the video capture device (604). In response to the indicated drop in FV, the CAF unit initiates a refocusing process (606). The refocusing process may involve actions such as, for example, adjusting the lens position until the video capture device achieves a desired focus, e.g., as indicated by a peaking of the FV. While the video capture device is performing the refocusing process, the captured frames may be out of focus and may as a result be blurry. The video capture device may estimate the blurriness level in each frame captured during the refocusing process (608). The video capture device may include a blurriness estimation unit 108 (FIG. 1) that implements algorithms to estimate a frames blurriness level, as described above. The estimated blurriness levels may then be used to readjust the QP that the video encoder utilizes in its quantization functionality. The QP controls the degree of quantization applied to residual transform coefficient values produced by the encoder. When an encoder utilizes more quantization, a greater amount of image detail is retained. However, using more quantization results in a higher encoding data rate. As the quantization decreases, the video encoding rate drops, but some of the detail gets lost, and the image may become more distorted. In blurry images, details of the images are already distorted, and a video encoder may decrease quantization, without affecting the quality of the image. In accordance with this disclosure, the video capture device or the video encoder may readjust the QP to a larger value for frames captured during the refocusing process based on the amount of blurriness in the frames.

In one example of this disclosure, the video capture device may implement the QP readjustment, and send the adjusted QP to the video encoder to further reduce the amount of computations that the video encoder performs, as illustrated in FIG. 6B. In this example, based on the estimated blurriness level, the video capture device may readjust the QP value that the video encoder uses to encode a frame (610). The video capture device may then communicate to the video encoder the readjusted QP value and the estimated blurriness level (612). The video encoder then utilizes the readjusted QP value for quantization, and the estimated blurriness level to simplify several encoding algorithms, as described above.

In another example of this disclosure, the video capture device may communicate the estimated blurriness level to the video encoder (614), as illustrated in FIG. 6C. In this example, the video encoder may readjust the QP based on the estimated blurriness level, and utilize the readjusted QP for quantization. The video encoder may also utilize the estimated blurriness level to simplify several encoding algorithms, as described above.

Figure 7:
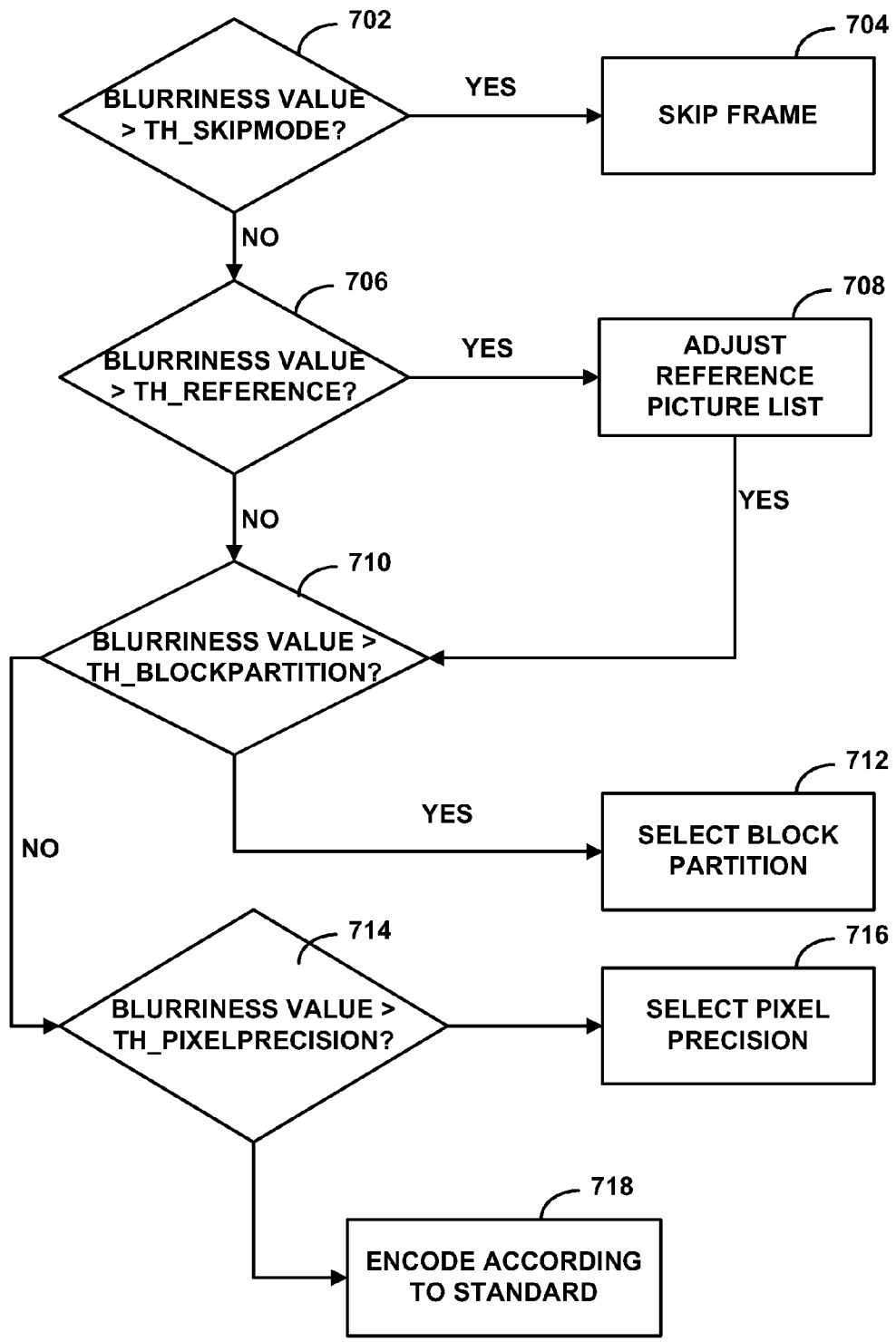
FIG. 7 is a flow diagram illustrating video encoding using the estimate of blurriness levels to simplify encoding algorithms in accordance with aspects of this disclosure.

FIG. 7 is a flow diagram illustrating video encoding using the estimate of blurriness levels to simplify encoding algorithms in accordance with aspects of this disclosure. A video capture device, e.g., video capture device 102 of FIG. 1 or 202 of FIG. 2, may estimate a blurriness level of a captured frame as described above. The video capture device may send the estimated blurriness level to a video encoder, e.g., video encoder 110 of FIG. 1 or 210 of FIG. 2, which may utilize the estimated blurriness level to simplify encoding algorithms. The video encoder may simplify encoding algorithms based on the level of blurriness in the frame, which the video encoder may determine based on comparison with thresholds associated with the different encoding algorithms. In one example, the video encoder may compare the estimated blurriness level to a threshold associated with frame skip mode (702). If the estimated blurriness level exceeds the threshold for frame skip mode, the video encoder may activate skip mode (704), and the frame may be skipped without encoding, because the video encoder operates on the assumption that the blurriness level is so high that a group of consecutive frames will look substantially identical. As a result, the video encoder may encode one of the blurry frames, and skip encoding the other substantially identical blurry frames. If the skip mode is activated, and the frame is therefore skipped, the frame may not be encoded, and therefore, the video encoder may not need to proceed in making decisions regarding the other encoding algorithm simplification.

If the estimated blurriness level does not exceed the threshold for frame skip mode, the video encoder does not activate the skip mode, and may proceed to determine whether to adjust the reference picture list. In one example, the video encoder may compare the estimated blurriness level to a threshold associated with the reference frame (706). If the estimated blurriness level exceeds the threshold, the video encoder may limit the reference picture list to a subset of frames, such as, for example, the frame preceding the current blurry frame (708) and may proceed to determine the partition size, e.g., a block partition size, for motion estimation. If the estimated blurriness level does not exceed the threshold, the video encoder may utilize the existing reference picture list, and proceed to determine the block partition size for motion estimation.

In one example, the video encoder may compare the estimated blurriness level to a threshold associated with the partition block (710). If the estimated blurriness level exceeds the threshold, the video encoder may utilize a larger block partition for encoding motion estimation (712). For example, in H.264 encoding utilizes block partitions in sizes of 16×16, 8×16, 16×8, 8×8, 4×8, 8×4, and 4×4. For blurry frames, the video encoder may implement motion estimation utilizing larger partitions, e.g., 16×16, 8×16, and 16×8, therefore, requiring encoding of less motion pictures. The video encoder may proceed to determine the pixel precision for motion estimation. If the estimated blurriness level does not exceed the threshold, the video encoder may utilize the block partition according to its usual implementation, and proceed to determine the pixel precision for motion estimation. In one example, when a frame contains blurry content, the level of the blurriness may be determined and based on the severity of blurriness, a block partition may be determined accordingly, where larger partition blocks may be utilized for a greater amount of blurriness.

In one example, the video encoder may compare the estimated blurriness level to a threshold associated with pixel precision used in motion estimation (714). If the estimated blurriness level exceeds the threshold, the video encoder may adjust the pixel precision for implementing motion estimation (716), where a larger pixel precision may be used for blurry images, thus requiring fewer computations. In one example, the video encoder may utilize integer pixel precision, thus eliminating the need for sub-pixel interpolation in searching for reference blocks used in motion estimation. In another example, the video encoder may assess the severity of blurriness in a frame, and adjust the pixel precision accordingly. For example, the video encoder may utilize integer pixel precision for frames with a large amount of blurriness, but a relatively larger sub-pixel precision, e.g., ½, for frames with a smaller level of blurriness. If the estimated blurriness level does not exceed the threshold, the video encoder may encode the frame in the same manner the video encoder encodes frames with no blurriness.

The video encoder may utilize the modified encoding techniques for encoding frames captured during the refocus process, and may revert back to its normal encoding functionality for frames captured while the video capture device is in focus. In one example, the video encoder may use different levels of modifications for encoding algorithms and functionalities depending on the severity of the blur in the captured frames. For example, a higher level of blurriness may result in readjusting the QP to a larger value than that associated with a lesser level of blurriness. In one example, the video encoder may also utilize blurriness information received from the video capture device to implement deblurring functions.

The front end, e.g., video capture device, and the back end, e.g., video encoder, portions of the system may be connected directly or indirectly. In one example, the video capture device may be directly connected to the video encoder, for example, using some type of a wired connection. In another example, the camcorder may be indirectly connected to the video encoder, for example, using a wireless connection.

The techniques described in this disclosure may be utilized in a device to assist in the functionalities of a video encoder, or may be utilized separately as required by the device and the applications for which the device may be used.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause one or more programmable processors, or other processors, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

In an exemplary implementation, techniques described in this disclosure may be performed by a digital video coding hardware apparatus, whether implemented in part by hardware, firmware and/or software.

Various aspects and examples have been described. However, modifications can be made to the structure or techniques of this disclosure without departing from the scope of the following claims.

The invention claimed is:

1. A method comprising:
   estimating, in a video capture module, a blurriness level of a frame of video data captured during a refocusing process, wherein said estimating is based on at least one refocusing statistic associated with the frame; and
   encoding, in a video encoder, the frame based at least in part on the estimated blurriness level of the frame.

2. The method of claim 1, wherein said at least one refocusing statistic includes at least one of (A) a focus value associated with the frame and (B) an indication of lens position.

3. The method of claim 1, wherein encoding comprises selecting, based on the estimated blurriness level, a level of quantization to be used for encoding the frame.

4. The method of claim 3, wherein selecting a level of quantization comprises:
   selecting a first quantization level for a first estimated blurriness level; and
   selecting a second quantization level for a second estimated blurriness level,
   wherein the first quantization level is larger than the second quantization level and the first estimated blurriness level is larger than the second estimated blurriness level.

5. The method of claim 1, wherein encoding comprises selecting, based on the estimated blurriness level, a partition size to be used for encoding the frame.

6. The method of claim 5, wherein selecting a partition size comprises:
- selecting a first partition for a first estimated blurriness level; and
- selecting a second partition for a second estimated blurriness level,
- wherein the first partition is larger than the second partition and the first estimated blurriness level is larger than the second estimated blurriness level.

7. The method of claim 1, wherein encoding comprises selecting, based on the estimated blurriness level, a pixel precision level to be used for encoding the frame.

8. The method of claim 7, wherein selecting a pixel precision level comprises:
- selecting a first pixel precision level for a first estimated blurriness level; and
- selecting a second pixel precision level for a second estimated blurriness level,
- wherein the first pixel precision level is lower than the second pixel precision level and the first estimated blurriness level is larger than the second estimated blurriness level.

9. The method of claim 1, wherein encoding comprises selecting, based on the estimated blurriness level, a set of reference frames to be used for encoding the frame.

10. The method of claim 9, wherein selecting a set of reference frames comprises:
- selecting a first set of reference frames for a first estimated blurriness level; and
- selecting a second set of reference frames for a second estimated blurriness level,
- wherein the first set of reference frames is smaller than the second set of reference frames and the first estimated blurriness level is larger than the second estimated blurriness level.

11. The method of claim 1, wherein encoding comprises one of:
- discarding the frame if the estimated blurriness level exceeds a threshold; and
- encoding the frame using skip mode if the estimated blurriness level exceeds the threshold.

12. A system comprising:
- a video capture module to estimate a blurriness level of a frame of video data captured during a refocusing process of the video capture module, wherein said estimating is based on at least one refocusing statistic associated with the frame; and
- a video encoder to encode the frame based at least in part on the estimated blurriness level of the frame.

13. The system of claim 12, wherein said at least one refocusing statistic includes at least one of (A) a focus value associated with the frame and (B) an indication of lens position.

14. The system of claim 12, wherein the video encoder encodes the frame by selecting, based on the estimated blurriness level, a level of quantization to be used for encoding the frame.

15. The system of claim 14, wherein the video encoder selects a level of quantization by:
- selecting a first quantization level for a first estimated blurriness level; and
- selecting a second quantization level for a second estimated blurriness level,
- wherein the first quantization level is larger than the second quantization level and the first estimated blurriness level is larger than the second estimated blurriness level.

16. The system of claim 12, wherein the video encoder encodes the frame by selecting, based on the estimated blurriness level, a partition size to be used for encoding the frame.

17. The system of claim 16, wherein the video encoder selects a partition size by:
- selecting a first partition for a first estimated blurriness level; and
- selecting a second partition for a second estimated blurriness level,
- wherein the first partition is larger than the second partition and the first estimated blurriness level is larger than the second estimated blurriness level.

18. The system of claim 12, wherein the video encoder encodes the frame by selecting, based on the estimated blurriness level, a pixel precision level to be used for encoding the frame.

19. The system of claim 18, wherein the video encoder selects a pixel precision level by:
- selecting a first pixel precision level for a first estimated blurriness level; and
- selecting a second pixel precision level for a second estimated blurriness level,
- wherein the first pixel precision level is lower than the second pixel precision level and the first estimated blurriness level is larger than the second estimated blurriness level.

20. The system of claim 12, wherein the video encoder encodes the frame by selecting, based on the estimated blurriness level, a set of reference frames to be used for encoding the frame.

21. The system of claim 20, wherein the video encoder selects a set of reference frames by:
- selecting a first set of reference frames for a first estimated blurriness level; and
- selecting a second set of reference frames for a second estimated blurriness level,
- wherein the first set of reference frames is smaller than the second set of reference frames and the first estimated blurriness level is larger than the second estimated blurriness level.

22. The system of claim 12, wherein the video encoder encodes the frame by one of:
- discarding the frame if the estimated blurriness level exceeds a threshold; and
- encoding the frame using skip mode if the estimated blurriness level exceeds the threshold.

23. A non-transitory computer-readable medium comprising instructions for causing a programmable processor to:
- estimate, in a video capture module, a blurriness level of a frame of video data captured during a refocusing process, wherein said estimating is based on at least one refocusing statistic associated with the frame; and
- encode, in a video encoder, the frame based at least in part on the estimated blurriness level of the frame.

24. The non-transitory computer-readable medium of claim 23, wherein said at least one refocusing statistic includes at least one of (A) a focus value associated with the frame and (B) an indication of lens position.

25. The non-transitory computer-readable medium of claim 23, wherein the instructions to encode comprise instructions to select, based on the estimated blurriness level, a level of quantization to be used for encoding the frame.

26. The non-transitory computer-readable medium of claim 25, wherein the instructions to select a level of quantization comprise instructions to:

select a first quantization level for a first estimated blurriness level; and
select a second quantization level for a second estimated blurriness level,
wherein the first quantization level is larger than the second quantization level and the first estimated blurriness level is larger than the second estimated blurriness level.

27. The non-transitory computer-readable medium of claim 23, wherein the instructions to encode comprise instructions to select, based on the estimated blurriness level, a partition size to be used for encoding the frame.

28. The non-transitory computer-readable medium of claim 27, wherein the instructions to select a partition size comprise instructions to:
select a first partition for a first estimated blurriness level;
select a second partition for a smaller second blurriness level,
wherein the first partition is larger than the second partition and the first estimated blurriness level is larger than the second estimated blurriness level.

29. The non-transitory computer-readable medium of claim 23, wherein the instructions to encode comprise instructions to select, based on the estimated blurriness level, a pixel precision level to be used for encoding the frame.

30. The non-transitory computer-readable medium of claim 29, wherein the instructions to select a pixel precision level comprise instructions to:
select a first pixel precision level for a first estimated blurriness level; and
select a second pixel precision level for a second estimated blurriness level,
wherein the first pixel precision level is lower than the second pixel precision level and the first estimated blurriness level is larger than the second estimated blurriness level.

31. The non-transitory computer-readable medium of claim 23, wherein the instructions to encode comprise instructions to select, based on the estimated blurriness level, a set of reference frames to be used for encoding the frame.

32. The non-transitory computer-readable medium of claim 31, wherein the instructions to select a set of reference frames comprises instructions to:
select a first set of reference frames for a first estimated blurriness level; and
select a second set of reference framer for a second estimated blurriness level,
wherein the first set of reference frames is smaller than the second set of reference frames and the first estimated blurriness level is larger than the second estimated blurriness level.

33. The non-transitory computer-readable medium of claim 23, wherein the instructions to encode comprise instructions to one of:
discard the frame if the estimated blurriness level exceeds a threshold; and
encode the frame using skip mode if the estimated blurriness level exceeds the threshold.

34. A system comprising:
means for estimating a blurriness level of a frame of video data captured during a refocusing process, wherein said estimating is based on at least one refocusing statistic associated with the frame; and
means for encoding the frame based at least in part on the estimated blurriness level of the frame.

35. The system of claim 34, wherein said at least one refocusing statistic includes at least one of (A) a focus value associated with the frame and (B) an indication of lens position.

36. The system of claim 34, wherein the means for encoding comprises means for selecting, based on the estimated blurriness level, a level of quantization to be used for encoding the frame.

37. The system of claim 36, wherein the means for selecting a level of quantization comprises:
means for selecting a first quantization level for a first estimated blurriness level; and
means for selecting a second quantization level for a second estimated blurriness level,
wherein the first quantization level is larger than the second quantization level and the first estimated blurriness level is larger than the second estimated blurriness level.

38. The system of claim 34, wherein the means for encoding comprises means for selecting, based on the estimated blurriness level, a partition size to be used for encoding the frame.

39. The system of claim 38, wherein the means for selecting a partition size comprises:
means for selecting a first partition for a first estimated blurriness level; and
means for selecting a second partition for a second estimated blurriness level,
wherein the first partition is larger than the second partition and the first estimated blurriness level is larger than the second estimated blurriness level.

40. The system of claim 34, wherein the means for encoding comprises means for selecting, based on the estimated blurriness level, a pixel precision level to be used for encoding the frame.

41. The system of claim 40, wherein the means for selecting a pixel precision level comprises:
means for selecting a first pixel precision level for a first estimated blurriness level; and
means for selecting a second pixel precision level for a second estimated blurriness level,
wherein the first pixel precision level is lower than the second pixel precision level and the first estimated blurriness level is larger than the second estimated blurriness level.

42. The system of claim 34, wherein the means for encoding comprises means for selecting, based on the estimated blurriness level, a set of reference frames to be used for encoding the frame.

43. The system of claim 42, wherein the means for selecting a set of reference frames comprises:
means for selecting a first set of reference frames for a first estimated blurriness level; and
means for selecting a second set of reference frames for a second estimated blurriness level,
wherein the first set of reference frames is smaller than the second set of reference frames and the first estimated blurriness level is larger than the second estimated blurriness level.

44. The system of claim 34, wherein the means for encoding comprises one of:
means for discarding the frame if the estimated blurriness level exceeds a threshold; and
means for encoding the frame using skip mode if the estimated blurriness level exceeds the threshold.

45. The method of claim 1, wherein said refocusing statistic is based on an indication of lens position.

46. The method of claim 1, wherein said at least one refocusing statistic includes an indication of lens position, and
wherein said estimating the blurriness level comprises, after capture of the frame has begun, using the indication of lens position to calculate the estimated blurriness level of the captured frame.

* * * * *